Oct. 23, 1962  R. R. STRATTON  3,059,791
GARBAGE LOADER
Filed July 7, 1959  2 Sheets-Sheet 1
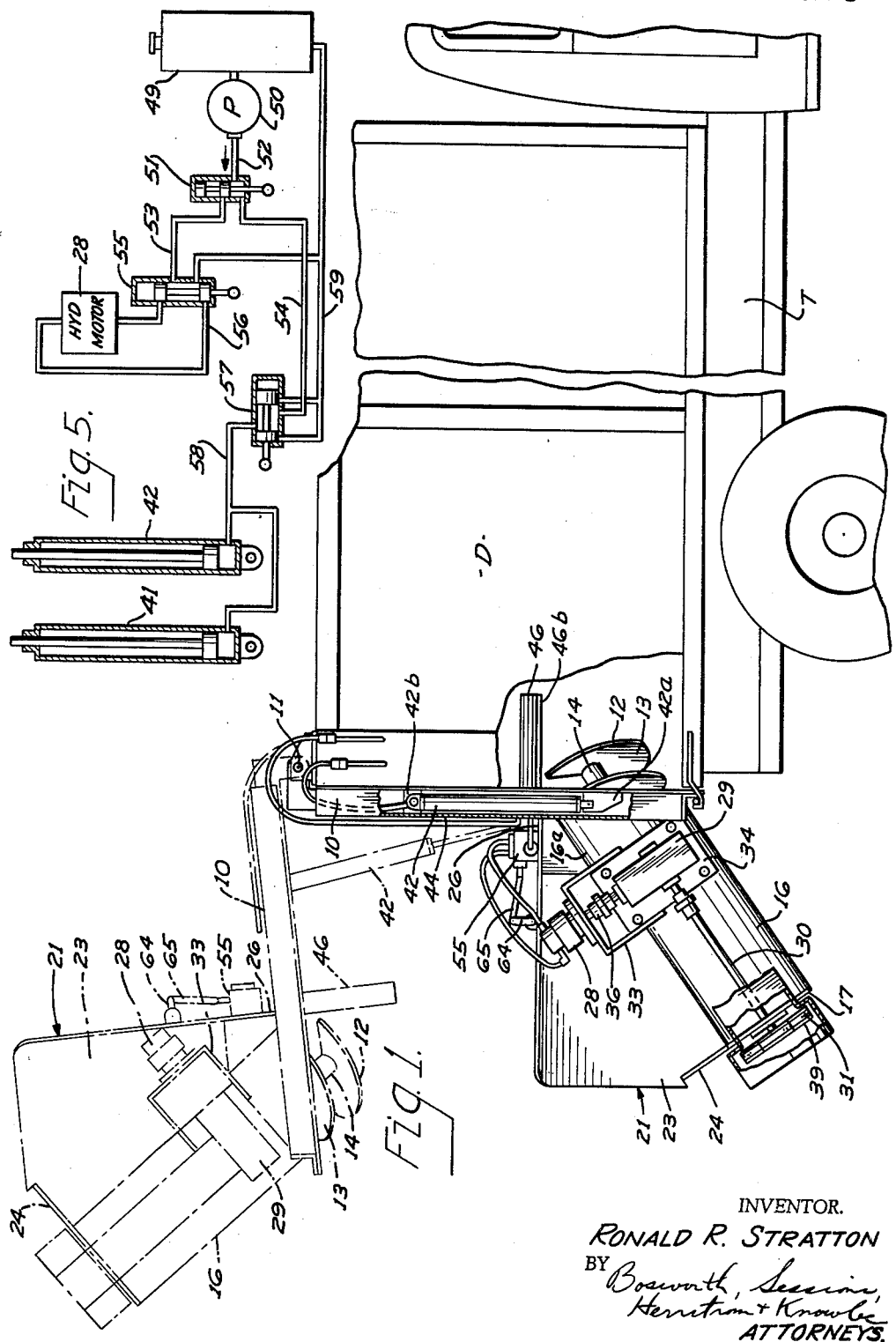
INVENTOR.
RONALD R. STRATTON
BY Bosworth, Sessions,
Herrstrom & Knowles
ATTORNEYS.

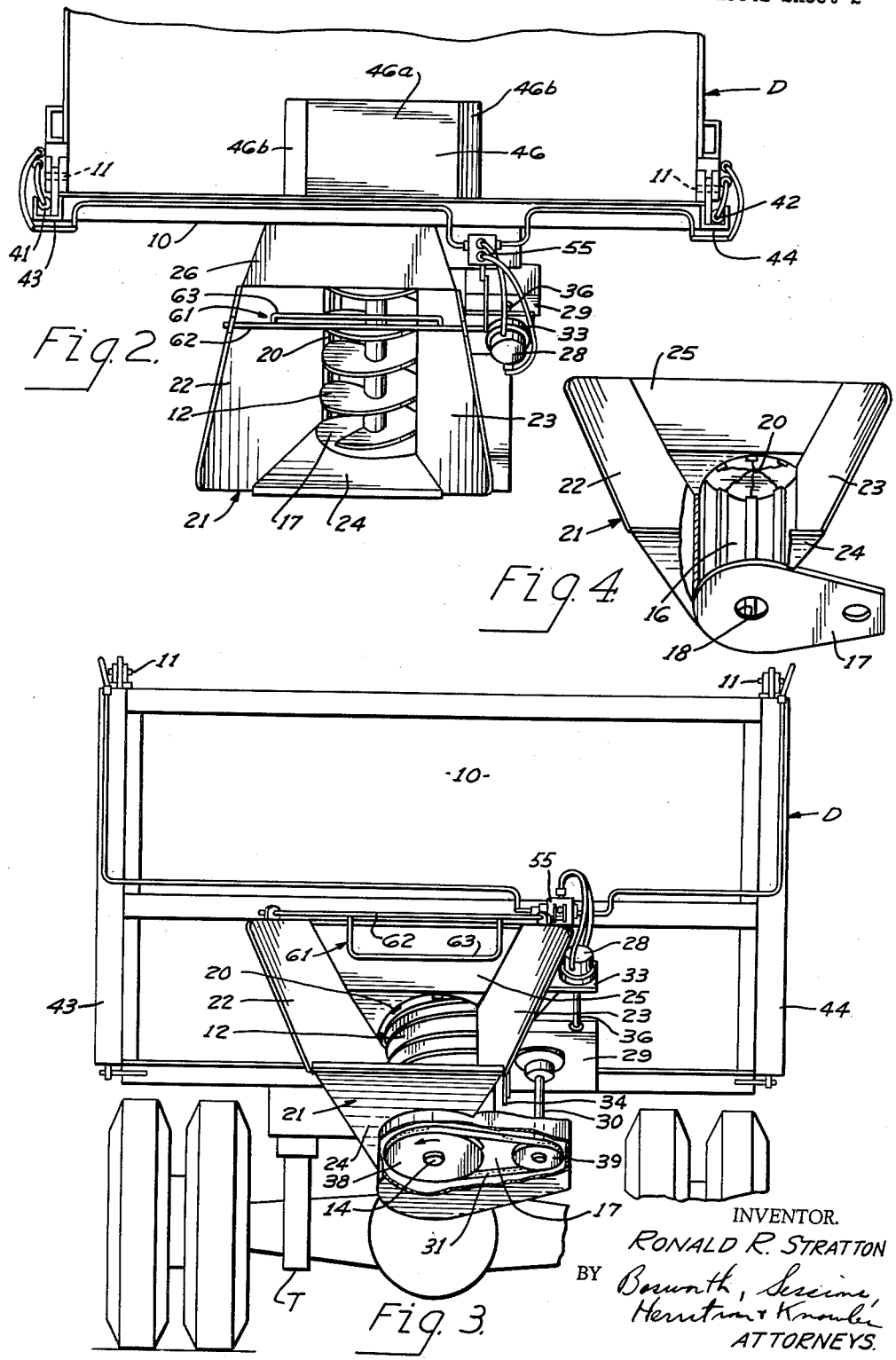

United States Patent Office 3,059,791
Patented Oct. 23, 1962

3,059,791
GARBAGE LOADER
Ronald R. Stratton, Cleveland, Ohio, assignor to The Stratton Equipment Company, Cleveland, Ohio, a corporation of Ohio
Filed July 7, 1959, Ser. No. 825,459
5 Claims. (Cl. 214—83.32)

This invention relates to loading devices and in particular to a hydraulically operated auger type garbage loader for use with a conventional dump truck.

The growing problem of garbage disposal begins with the pickup and collection of garbage and refuse from homes and businesses throughout urban areas. Present-day sanitation standards require frequent pickup and speedy disposal of garbage and refuse. Special purpose trucks especially designed to accomplish the pickup and collection function are often used for this purpose. Such special purpose trucks often have high lift hoppers or endless conveyers designed to operate with special bodies and are adapted to be used for no other purpose than refuse collection. In addition, such trucks are expensive and can only be economically utilized on a full-time basis.

Another common device for collecting refuse is a high sided dump truck or a truck having a similar general purpose body attached. While a dump truck is less expensive than a special purpose refuse body and can be used for other services, it is difficult to load and requires a crew of several men to operate it. Generally, the sides of the dump body are too high to permit a man on the ground to empty a refuse container into the dump body. This circumstance requires a second man stationed at some point above ground level on the truck, as on a catwalk, and who can receive the refuse container from the man on the ground, empty it into the dump body and return it to the ground man. Such a two-man operation is inefficient, time-consuming and fatiguing.

It is a general object of this invention, therefore, to provide an automatic bed-level garbage loader for use with a dump body for the efficient and speedy collection of refuse by one man, if necessary. Another object is to provide a garbage loader for use with a dump body that does not intrude upon all-purpose load carrying space and that permits the dump body to be used for general service in the normal manner. A further object is to provide a garbage loader for use with a dump body that permits conventional tail gate unloading of the dump body. Other objects of this invention are to provide a hydraulically operated garbage loader for use with a dump body that compacts the refuse forwardly into the dump body, assuring bigger loads per truck; to provide a rugged loader capable of handling cans, ordinary bricks and other hard trash, and to provide a hydraulically operated garbage loader that can be easily and inexpensively installed on a conventional dump body. These and other objects will become readily apparent from the following detailed description of a preferred form of this invention taken together with the accompanying drawings in which:

FIGURE 1 is a side elevation of the garbage loader of this invention, installed at the rear of a conventional dump truck body with portions of the loader housing and dump body broken away; also shown in broken lines is the unloading position of the garbage loader;

FIGURE 2 is a top view of the garbage loader installed on a dump body, the rear portion of the dump body only being shown;

FIGURE 3 is a front elevation of the garbage loader installed on the back end of a dump truck body with parts of the garbage loader housing broken away;

FIGURE 4 is a detail view of an isolated portion of the loader as seen in FIGURE 3 with parts removed to reveal underlying structure; and FIGURE 5 is a schematic representation of the hydraulic system of the garbage loader.

As seen in FIGURE 1, a preferred form of garbage loader of this invention comprises a tail gate 10 hinged by means of hinge pins 11 at its top at or near the top edge of the back of a dump body D that is conventionally mounted on a truck chassis T. The tail gate 10 is mounted similarly to and replaces a conventional dump body tail gate. The tail gate 10 is provided with an elliptical opening near the middle of its bottom edge through which is mounted an auger 12. The auger 12 comprises a helical screw 13 of uniform pitch mounted on a shaft 14 located along the axis of the screw. When the tail gate 10 of the dump body D is vertical, auger 12 is inclined from the horizontal so that its outer end is lower than the end passing through the opening in the tail gate 10 and so that the elliptical opening in the tail gate is substantially filled by the auger 12 of circular cross section passing through it at an angle.

The auger 12 is journaled for rotation about shaft 14 by an auger tube 16 of sufficient diameter to accommodate the radially outward periphery of helical screw 13. One end of auger tube 16 is fixedly attached to and meets tail gate 10 at an angle so that the tube wall engages the tail gate along the periphery of the elliptical opening to support auger 12 in its inclined position. The lower end of auger tube 16 is closed by an end plate 17. End plate 17 is provided with a central hole 18 to accommodate the end of auger shaft 14. End plate 17 also extends outwardly from one side of auger tube 16 to support a portion of the auger driving means to be described below. As shown in FIGURES 2 and 3, auger tube 16 has a portion of its wall removed to provide an opening and is mounted on tail gate 10 so that this opening faces in a generally upward direction, exposing a length of auger 12 and providing a charge opening for loading refuse into the tube so that it can be advanced by the screw 13.

The charge opening preferably extends in width through an approximately 135° arc of the tube wall and in length from end plate 17 to within a short distance of the upper end of the tube 16, leaving a short length 16a of complete tube surrounding the auger 12 just before it passes through the elliptical opening in tail gate 10. Auger 12 is free to rotate in auger tube 16 with the upper end extending beyond the upper end of auger tube 16 into the dump body. The inside surface of auger tube 16 is preferably provided with axially extending hardened replaceable ribs 20 as shown in FIGURE 4, which illustrates the auger tube 16 with auger 12 removed. Ribs 20 reduce the frictional resistance to rotation of and act as lateral guides for the auger 12. End plate 17 takes end thrust directed outwardly from the dump body D.

Extending upwardly from and surrounding the opening in the wall of auger tube 16 is a hopper indicated generally at 21 consisting of side walls 22 and 23, front wall 24 and back wall 25. The side walls 22 and 23 are inclined outwardly and upwardly from the longitudinal sides of the opening in auger tube 16. The front of hopper 21 is closed by front wall 24 connected to and extending between side walls 22 and 23. The front wall 24 is somewhat lower than the side walls 22 and 23 and lies in the plane of end plate 17. Back wall 25 extends upwardly from the end of the opening in auger tube 16 near tail gate 10 and is connected to and extends between side walls 22 and 23. A top horizontal plate 26 joins the top of back wall 25 and tail gate 10.

It will be noted in FIGURES 2, 3 and 4 that the charge opening in auger tube 16, to whose longitudinal edges side walls 22 and 23 are attached, faces slightly to the left of vertical and, therefore, side wall 22 is somewhat deeper than side wall 23. I prefer this slightly asymmetrical arrangement of the opening in the auger tube 16 and the side walls 22 and 23 of hopper 21 when using an auger rotating in a counterclockwise direction as shown in FIGURE 3 because it provides for a better pickup by auger 12 of the refuse dumped in the hopper. A symmetrical hopper may be utilized with an auger tube having its opening facing the vertical. If the auger is pitched to rotate in a clockwise direction, I would prefer, of course, to have the opening in the auger tube face slightly to the right of vertical with hopper side wall 23 deeper than side wall 22.

The auger 12 is driven by means of a hydraulic motor 28 through a speed reducing right angle drive 29, a drive shaft 30 and V-belt 31. The motor 28 and drive 29 are carried by mounting brackets 33 and 34, respectively, attached to the side of auger tube 16 and adjacent the tail gate 10. The motor 28 is mounted above the drive 29 and is connected to an input shaft 36, extending from the top of the drive. The output shaft 30 extends parallel to and along the side of auger tube 16 and through a hole in the projecting portion of end plate 17. Auger shaft 14 and output shaft 30 are provided with pulleys 38 and 39, respectively, connected by a V-belt 31 which transmits power from the output shaft 30 to the auger shaft 14.

The tail gate 10 is provided with a pair of hydraulic cylinders 41 and 42, lying in channels 43 and 44, respectively, that form the vertical sides of tail gate 10. Hydraulic cylinders 41 and 42 act between brackets 41a and 42a, respectively, on the dump body D and brackets 41b and 42b, respectively, on tail gate 10 in order to raise the tail gate for dumping of the contents of dump body D. It will be noted that the hinge pins 11, about which tail gate 10 pivots, are offset from the line of action of hydraulic cylinders 41 and 42 when the tail gate is in a closed position providing the necessary lever arm to enable the hydraulic cylinders to swing the tail gate upwardly.

A deflection plate 46 having a flat central portion 46a and downwardly inclined ends 46b extends horizontally into the dump body D and is mounted on the inside of tail gate 10 above the opening therein to deflect the refuse introduced into the dump body by auger 12 and provides a forward compacting action in cooperation with the auger to the refuse within the dump body D. The auger 12 extends upwardly into the dump body D to within a short distance of and at an angle to horizontally extending deflection plate 46 to provide the compacting action. The slight intrusion of the end of auger 12 into the body and the deflection plate 46 cooperate to provide this desirable action without any appreciable diminution of the space within the dump body for refuse collection or general service.

The hydraulic motor 28 and hydraulic cylinders 41 and 42 are energized from and controlled by a hydraulic system shown schematically in FIGURE 5. Fluid from a reservoir 49 is supplied to the system by pump 50 which may be driven by a suitable conventional power take off from the internal combustion engine of the truck. The output of pump 50 is connected to a selector valve 51 by fluid line 52. Selector valve 51 supplies pump pressure to fluid line 53 or 54 in accordance with its position. Fluid line 53 is connected through an on-off valve 55 to hydraulic motor 28. A recirculating return line 56 returns the fluid from hydraulic motor 28 through on-off valve 55 to reservoir 49. Fluid line 54 from selector valve 51 leads to a hydraulic cylinder control valve 57. Hydraulic cylinders 41 and 42 are connected in parallel by fluid line 58 to control valve 57. Return line 59 provides a fluid return path to the reservoir 49 from control valve 57 and on-off valve 55.

The hydraulic system described above functions to supply pump pressure to the hydraulic motor 28 through its associated on-off valve 55 or to the tail gate lifting cylinders 41 and 42 through their associated control valve 57. Selector valve 51 and hydraulic cylinder control valve 57 are located at any convenient point on the truck and are preferably located near the control valve for actuating the dump body D. The on-off motor valve 55 for controlling hydraulic motor 28 is mounted on top of the hopper 21 where it is actuated by a safety bar and operating lever assembly 61 mounted on hopper 21. As shown in FIGURES 2 and 3, assembly 61 consists of a rod 62 extending between the top of side walls 22 and 23 of hopper 21 substantially over the mid-portion of the opening in auger tube 16 and a bar 63 formed in a U shape attached to rod 62 and projecting downwardly into and substantially across the width of hopper 21. An arm 64, extending perpendicularly from one end of rod 62, is connected by a link 65 to on-off motor valve 55. Assembly 61 and motor valve 55 are arranged so that when the depending portion of rod 63 is swung toward tail gate 10, motor valve 55 turns motor 28 off and when swung away, turns motor 28 on. Assembly 61 thus provides an operating lever accessible from both sides of hopper 21 and a safety bar which automatically turns off hydraulic motor 28 driving auger 12 if the operator accidently should become drawn into the auger 12.

The garbage loader of this invention is operated by first positioning selector valve 51 to supply pump pressure to motor valve 55 which in turn is positioned by operating lever assembly 61 to supply pump pressure to hydraulic motor 28 and thus drive auger 12 in auger tube 16. With auger 12 turning in auger tube 16, refuse is dumped into hopper 21 and the charge opening from where it is conveyed by auger 12 through the opening in tail gate 10 into dump body D. As successive hopper loads of refuse are placed into hopper 21 and conveyed by auger 12 into dump body D, previously conveyed loads are displaced forwardly in the dump body D and are compacted by the coaction of auger 12 and deflection plate 46. When the dump body D is filled or refuse collections are completed, auger 12 and auger motor 28 are stopped by means of operating lever assembly 61 and the vehicle carrying dump body D with the refuse loader mounted thereon is driven to a refuse dumping point.

The dump body D is emptied by raising tail gate 10 and tilting the dump body in a conventional manner. The tail gate 10, carrying auger 12, auger tube 16, hopper 21 and hydraulic motor 28 and its drive apparatus, is swung about hinge pins 11 by hydraulic cylinders 41 and 42 as shown in dotted lines in FIGURE 1. These cylinders are actuated by first positioning selector valve 51 to supply pump pressure to control valve 57 which is in turn positioned to supply fluid to the cylinders through fluid line 58. As shown in FIGURE 1, tail gate 10, carrying the conveyor and conveyor driving means, can be swung through a sufficient arc to open the entire rear side of dump body D, permitting easy disposal of the refuse from within. When dump body D is empty, it is returned to its normal horizontal carrying position and control valve 57 is operated to close tail gate 10 by allowing the fluid from cylinders 41 and 42 to return to reservoir 49 through fluid line 58 and return line 59. The dump truck embodying the garbage loader of this invention is then ready for continued refuse collection service or any general service in which a conventional dump truck might be employed.

It will be noted that the garbage loader of this invention has a hopper that can be easily filled by an operator standing on the ground to facilitate speedy and efficient refuse collection. Also, the preferred arrangement of the hydraulic controls provides a safety feature because the auger and hydraulically operated tail gate cannot be operated simultaneously. Thus, when the tail gate is opening or closing and the end of the auger passing through the tail gate is exposed, the auger cannot be made to turn. In addition, by this invention, conventional dump trucks can be adapted to a garbage collection service without sacrificing any of their performance in general service. The loader is rugged and uncomplicated and may be installed on a conventional dump track with a minimum of time and expense.

Those skilled in the art will appreciate that various changes and modifications can be made in the preferred form of apparatus described herein without departing from the spirit and scope of the invention.

I claim:

1. A refuse loader for a conventional motor vehicle dump body having a bed and side walls comprising an elliptical opening through one of said side walls adjacent its lower edge, a circular tube having one end open and attached to said one of the side walls around the periphery of said opening, said tube extending axially outwardly and downwardly from said opening, an auger in said tube extending through and beyond said opening into said dump body and having a helical screw and an axial shaft, said helical screw having an external diameter approximately equal to the internal diameter of said tube and being supported and journaled about its radially outward periphery by said tube, said tube having in a portion of its length a charge opening facing upwardly, a hopper mounted on said tube surrounding and extending upwardly from said charge opening, a deflection plate attached to said one of said side walls above and adjacent to said opening therethrough and extending into said dump body above and adjacent that portion of said auger extending into said dump body and in coacting relationship with said auger and drive means connected to the lower outboard end of said shaft for rotating said auger in said tube.

2. A refuse loader for a conventional motor vehicle dump body having a bed and side walls comprising an elliptical opening through one of said side walls adjacent its lower edge, a circular tube having one end open and attached to said one of the side walls around the periphery of said opening and a plurality of longitudinally extending ribs spaced apart around the inside of its walls, said tube extending axially outwardly and downwardly from said opening, an auger in said tube extending through and beyond said opening into said dump body and having a helical screw and an axial shaft, said helical screw being supported and journaled about its radially outward periphery by said ribs coaxially with and within said tube, said tube having in a portion of its length a charge opening facing upwardly and to one side of vertical in the direction of rotation of said auger, a hopper mounted on said tube surrounding and extending upwardly from said charge opening, a deflection plate attached to said one of said side walls above and adjacent to said opening therethrough and extending into said dump body above and adjacent that portion of said auger extending into said dump body and in coacting relationship with said auger and drive means connected to said shaft for rotating said auger in said tube.

3. A refuse loader for a conventional motor vehicle dump body comprising a hydraulically operated tail gate hinged along its top edge to the rear of the dump body and having an elliptical opening therethrough adjacent its lower edge, a tube of circular cross section having one end open and attached to said tail gate along the periphery of said opening and the other end closed and a plurality of longitudinally extending ribs spaced apart around the inside of its walls, said tube extending axially outwardly and downwardly from said opening, an auger in said tube extending from said closed end through and beyond said opening into the dump body and having a helical screw and an axial shaft, said helical screw being supported and journaled about its radially outward periphery by said ribs in said tube, said shaft extending through said closed end of said tube, said tube having in a portion of its length a charge opening facing upwardly, a hopper mounted on said tube and extending upwardly from said charge opening, a deflection plate attached to said tail gate above and adjacent to said opening therethrough and extending into said dump body above and adjacent that portion of said auger extending into said dump body and in coacting relationship with said auger and drive means connected to said shaft for rotating said auger in said tube.

4. A refuse loader for a conventional motor vehicle dump body comprising a hydraulically operated tail gate hinged along its top edge to the rear of the dump body and having an elliptical opening therethrough adjacent its lower edge, a tube of circular cross section having one end open and attached to said tail gate along the periphery of said opening and the other end closed and a plurality of longitudinally extending ribs spaced apart around the inside of its walls, said tube extending axially outwardly and downwardly from said opening, an auger in said tube extending from said closed end through and beyond said opening into the dump body and having a helical screw and an axial shaft, said helical screw being supported and journaled about its radially outward periphery by said ribs in said tube, said shaft extending through said closed end of said tube, said tube having in a portion of its length a charge opening facing upwardly and to one side of vertical in the direction of rotation of said auger, a hopper mounted on said tube and extending upwardly from said charge opening, a deflection plate attached to said tail gate above and adjacent to said opening therethrough and extending into said dump body above and adjacent that portion of said auger extending into said dump body and in coacting relationship with said auger, hydraulic drive means connected to said shaft for rotating said auger in said tube and hydraulic control and supply system for operating said hydraulic tail gate and auger drive.

5. A refuse loader for a conventional motor vehicle dump body having a bed and side walls comprising an opening through one of said side walls adjacent its lower edge, a circular tube having one end open and attached to said one of the side walls around the periphery of said opening, said tube extending axially outwardly from said opening, an auger in said tube extending through and beyond said opening into said dump body and having a helical screw and an axial shaft, said helical screw being supported and journaled about its radially outward periphery by said tube, said tube having in a portion of its length a charge opening facing upwardly, a hopper mounted on said tube surrounding and extending upwardly from said charge opening, hydraulic drive means connected to said shaft for rotating said auger in said tube, a control valve associated with said hydraulic drive means for controlling said hydraulic drive means, a safety bar and operating lever pivotally mounted above said charge opening for swinging motion parallel to said auger and having a portion extending transversely of and depending into said hopper, said safety bar and operating lever being connected to said control valve whereby movement of said depending portion in the direction of feed of said auger shuts off said hydraulic drive means and movement of said depending portion in the other direction turns on said hydraulic drive means.

References Cited in the file of this patent

UNITED STATES PATENTS

| | | |
|---|---|---|
| 1,477,212 | Eckertz | Dec. 11, 1923 |
| 2,307,692 | Linde | Jan. 5, 1943 |
| 2,627,988 | Thomas et al. | Feb. 10, 1953 |
| 2,731,969 | Hoeksema | Jan. 24, 1956 |
| 2,778,518 | Brown | Jan. 22, 1957 |
| 2,818,165 | Dupps | Dec. 31, 1957 |

FOREIGN PATENTS

| | | |
|---|---|---|
| 38,177 | Germany | Feb. 18, 1886 |
| 370,281 | Germany | Mar. 1, 1923 |
| 688,284 | Germany | Feb. 16, 1940 |